(12) United States Patent
Joyce-Brady

(10) Patent No.: US 11,393,001 B2
(45) Date of Patent: Jul. 19, 2022

(54) METHODS AND SYSTEMS FOR HAIR-SERVICE BASED DIGITAL IMAGE SEARCHING AND RANKING

(71) Applicant: Jessica Joyce-Brady, San Francisco, CA (US)

(72) Inventor: Jessica Joyce-Brady, San Francisco, CA (US)

(73) Assignee: HairLooks Inc., San Francisco, CA (US)

( * ) Notice: Subject to any disclaimer, the term of this patent is extended or adjusted under 35 U.S.C. 154(b) by 34 days.

(21) Appl. No.: 16/251,012

(22) Filed: Jan. 17, 2019

(65) Prior Publication Data

US 2019/0392496 A1    Dec. 26, 2019

Related U.S. Application Data

(60) Provisional application No. 62/793,170, filed on Jan. 16, 2019, provisional application No. 62/618,543, filed on Jan. 17, 2018.

(51) Int. Cl.
*G06Q 30/06* (2012.01)
*G06F 16/9535* (2019.01)
(Continued)

(52) U.S. Cl.
CPC ... *G06Q 30/0603* (2013.01); *G06F 16/24578* (2019.01); *G06F 16/535* (2019.01);
(Continued)

(58) Field of Classification Search
CPC ..... G06Q 30/0601–0645; G06Q 30/08; G06Q 30/0603; G06Q 30/0625; G06F 16/535;
(Continued)

(56) References Cited

U.S. PATENT DOCUMENTS

2002/0165868 A1* 11/2002 Kayahara ............... G06F 16/532
2003/0107570 A1*  6/2003 Solazzi ................... G06T 17/20
                                                                345/420

(Continued)

OTHER PUBLICATIONS

Sarah Perez, StyleSeat, An Online Marketplace for Stylists & Beauty Pros, Raises $10.2M Series A From Lightspeed, TechCrunch, Jan. 22, 2014 (Year: 2014).*

*Primary Examiner* — Allison G Wood
*Assistant Examiner* — Anna Mae Mitros
(74) *Attorney, Agent, or Firm* — Goodwin Procter LLP

(57) ABSTRACT

In one aspect, a computerized method for implementing a hair-service based digital image search engine and ranking comprising the step of providing a hair-service search engine, wherein the hair-service search engine receives a digitalized hair-style portfolio from a hair stylist. The hair-style portfolio comprises a set of hair-style digital images. The set of hair-style digital images comprises one or more views of a set of hair-stylist customers. The method receives a set of tags for each hair-style digital image of set of hair-style digital images. Each tag comprises a hair-style descriptor of the hair style depicted in the hair-style digital image. The method receives a hair stylist contact information. The method stores the digitalized hair-style portfolio, the set of tags and the hair stylist contact information in a digitalized hair-style portfolio database; receives a hair-style search from a user. The method parses the hair-style search ad generating a set of terms.

20 Claims, 8 Drawing Sheets

(51) Int. Cl.
    *G06F 16/2457*    (2019.01)
    *G06F 16/58*      (2019.01)
    *G06F 16/535*     (2019.01)
(52) U.S. Cl.
    CPC ...... *G06F 16/5866* (2019.01); *G06F 16/9535* (2019.01); *G06Q 30/0625* (2013.01)
(58) Field of Classification Search
    CPC ............ G06F 16/5866; G06F 16/9535; G06F 16/24578
    USPC ................................................ 705/26.1–27.2
    See application file for complete search history.

(56) References Cited

U.S. PATENT DOCUMENTS

| | | | | |
|---|---|---|---|---|
| 2005/0251463 | A1* | 11/2005 | Nagai | G06Q 30/0601 705/26.1 |
| 2013/0030843 | A1* | 1/2013 | Schoenberg | G06Q 30/0601 705/3 |
| 2014/0236935 | A1* | 8/2014 | Doebele | G06Q 50/01 707/723 |
| 2016/0267403 | A1* | 9/2016 | Hoffart | G06Q 10/02 |
| 2016/0283564 | A1* | 9/2016 | Sharon | G06F 16/24578 |
| 2017/0011067 | A1* | 1/2017 | Masuko | G06Q 30/0204 |
| 2017/0046634 | A1* | 2/2017 | Terzian | G06F 16/958 |
| 2018/0005088 | A1* | 1/2018 | Farfade | G06K 9/6247 |
| 2018/0101894 | A1* | 4/2018 | Markoff | G06Q 30/0639 |
| 2018/0211308 | A1* | 7/2018 | Cheeks | G06Q 30/0623 |
| 2019/0350514 | A1* | 11/2019 | Purwar | A61B 5/0077 |

* cited by examiner

METHODS AND SYSTEMS FOR HAIR-SERVICE BASED DIGITAL IMAGE SEARCHING AND RANKING

CROSS-REFERENCE TO RELATED APPLICATIONS

This application is a claims priority from U.S. Provisional Patent Application No. 62/618,543, filed on 17 Jan. 2018 and titled METHODS AND SYSTEMS FOR HAIR-SERVICE BASED DIGITAL IMAGE SEARCHING AND RANKING. This application is hereby incorporated by reference in its entirety.

This application is a claims priority from U.S. Provisional Patent Application No. 62/793,170, filed on 16 Jan. 2019 and titled METHODS AND SYSTEMS FOR HAIR-SERVICE BASED DIGITAL IMAGE SEARCHING AND RANKING. This application is hereby incorporated by reference in its entirety.

FIELD OF THE INVENTION

The invention is in the field of digital image search and more specifically to a method, system and apparatus of automatic management of hair-service based digital image searching and ranking.

DESCRIPTION OF THE RELATED ART

A frequent problem in finding a hair stylist involves determining whether the hair stylist has experience with a particular hair style. For example, a user may want a particular haircut, style and coloring. Currently, the user must then interview hair stylists, seek referrals from friends, scan reviews on Yelp, scroll through hash tagged photos on Instagram, etc. These methods may not yield useful information. As a result, users are often unsatisfied with the trial and error aspect of searching for new hair stylists. Accordingly, improvements to hair-service based digital image searching are desired.

BRIEF SUMMARY OF THE INVENTION

In one aspect, a computerized method for implementing a hair-service based digital image search engine and ranking comprising the step of providing a hair-service search engine, wherein the hair-service search engine receives a digitalized hair-style portfolio from a hair stylist. The hair-style portfolio comprises a set of hair-style digital images. The set of hair-style digital images comprises one or more views of a set of hair-stylist customers. The method receives a set of tags for each hair-style digital image within the set of hair-style digital images. Each tag comprises a hair-style descriptor of the hair style depicted in the hair-style digital image. The method receives a hair stylist contact information. The method stores the digitalized hair-style portfolio, the set of tags and the hair stylist contact information in a digitalized hair-style portfolio database; receives a hair-style search from a user. The method parses the hair-style search ad generating a set of terms. The method matches the set of terms with the set of tags associated with a set of tags of a closest matching hair-style digital image of set of hair-style digital images. Based on the match between the set of terms with the set of tags, the method accesses a database of digitalized hair-style portfolios and obtains the closest matching hair-style digital images. The method communicates the closest matching hair-style digital image and the hair stylist contact information for each image to the user in the form of a search result.

Figure 1:
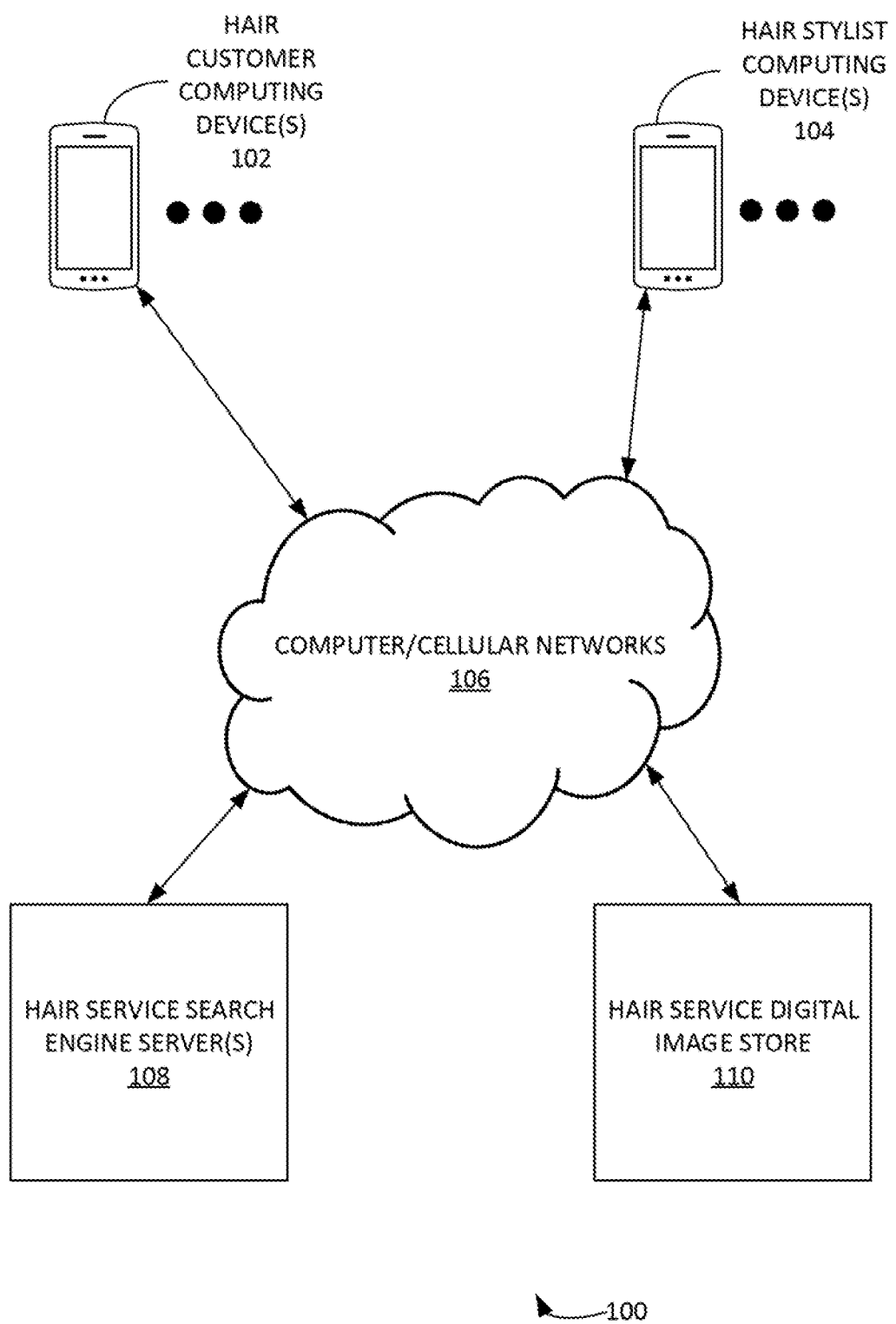
FIG. 1 illustrates an example system for hair-service based digital image searching and ranking, according to some embodiments.

The Figures described above are a representative set, and are not an exhaustive with respect to embodying the invention.

DESCRIPTION

Disclosed are a system, method, and article of hair-service based digital image searching and ranking. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Chatbot (e.g. an interactive agent, an Artificial Conversational Entity, etc.) can be a computer program which conducts a conversation via auditory or textual methods.

Cloud computing can involve deploying groups of remote servers and/or software networks that allow centralized data storage and online access to computer services or resources. These groups of remote serves and/or software networks can be a collection of remote computing services.

Content-based image retrieval (CBIR) can include the application of computer vision techniques to the image retrieval problem, that is, the problem of searching for digital images in large databases.

Deep learning is part of a broader family of machine learning methods based on learning data representations, as opposed to task-specific algorithms. Learning can be supervised, semi-supervised or unsupervised.

Hair professional can be an individual who is licensed by their state and/or country to perform hair services. The terms hair stylist and/or barber (and/or other hair professional) may be used interchangeably in the document, and both refer to this definition of a hair professional.

Hair customer can be an individual that hair professionals could provide their services to.

Hair product enterprise can be a company that sells products to licensed salons/barbers/spas for hair professionals to use during hair services, and/or sells products that can be used by the hair customer to maintain their hair.

Pattern recognition is a branch of machine learning that focuses on the recognition of patterns and regularities in data, although it is in some cases considered to be nearly synonymous with machine learning. Pattern recognition systems are in many cases trained from labeled "training" data (supervised learning), but when no labeled data are available other algorithms can be used to discover previously unknown patterns (unsupervised learning).

Virtual assistant can be a software agent that can perform tasks or services for an individual.

Exemplary Systems

FIG. 1 illustrates an example system 100 for hair-service based digital image searching and ranking, according to some embodiments.

Hair service search server 108 can enable clients to access hair-service (e.g. haircut, hair coloring, chemical processing, and other professional cosmetology and barbering services, etc.) related queries. Hair-service related queries can include text terms, digital images, voice input, etc. Hair-service related queries can be related to specific hair-services. For example, a text input can include the name of a specific hair-service or hair treatment. Digital input can include images of people with a specific hair-service or hair treatment. It is noted herein that in other examples, other cosmetician/design related services (e.g. nails, clothing styles, etc.) can be used in lieu of hair-services.

Hair service search server 108 can return hair-service search results for hair professionals (e.g. a licensed cosmetologist, barber or stylist) that match a specified set of parameters. Hair-service search results can include hair professional uploaded images, descriptions, digital videos, and/or metadata about the hair professional (e.g. location, office hours, prices, specializations, experience level, honors, etc.). Hair-service search results can be modified via the markup code of a web page (or mobile-device application display) to order search results based on relevancy to the customer's search terms. Hair service search server 108 can render search results for display on a web page and/or mobile-device application display. In one example, Hair service search server 108 can generate and manage a website/mobile application interface for the hair professional; website/mobile application interface for the salon/barber/spa; website/mobile application interface for the hair customer; website/mobile app interface for the hair product enterprise; etc. Examples of automatically generated hair-service search results rendered for display are provided infra.

Hair service search server 108 can use a digital search engine. Digital search engine can implement an image retrieval system. Image retrieval system can be a computer system for browsing, searching and retrieving images from a large database of digital images. Image retrieval system can automatically add metadata such as, inter alia: captioning, keywords, or descriptions to the images. Metadata can be used so that retrieval can be performed over the annotation words. Image retrieval system can utilize automatic image annotation methods.

Example automatic image annotation methods can include processes by which a Hair service search server 108 automatically assigns metadata in the form of captioning or keywords to a digital image. This application of computer vision techniques is used in image retrieval systems to organize and locate images of interest from a database. Hair service search server 108 can use multi-class image classification with a very large number of classes—as large as the vocabulary size. For example, Hair service search server 108 can implement image analysis in the form of extracted feature vectors and the training annotation words are used by machine learning techniques (e.g. as listed infra) to attempt to automatically apply annotations to new images. In one example method, Hair service search server 108 can learn the correlations between image features and training annotations. Hair service search server 108 can apply/use machine translation to translate the textual vocabulary with a define visual vocabulary and/or clustered regions known as blobs. Hair service search server 108 can also utilize various classification approaches, relevance models, etc.

Hair service search server 108 can utilize machine learning techniques (e.g. artificial neural networks, etc.). Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, deep-learning techniques and/or sparse dictionary learning.

Hair service search server 108 can utilize various pattern recognition methods, Content-based image retrieval (CBIR) methods, computer vision methods, etc. For example, Hair service search server 108 can utilize query by example using a CBIR system with an example image that it will then base its search upon. The result images can then all share common elements with the provided example.

Computer/Cellular networks 106 can include the Internet, text messaging networks (e.g. short messaging service (SMS) networks, multimedia messaging service (MMS) networks, proprietary messaging networks, instant messaging service networks, email systems, etc. Computer/Cellular networks 106 can include cellular networks, satellite networks, etc. Computer/Cellular networks 106 can be used to communicate messages and/or other information (e.g. videos, tests, articles, other educational materials, etc.) from the various entities of system 100.

Hair service search server 108 can include various other functionalities such as, inter alia: web servers, SMS servers, IM servers, chat bots, database system managers, e-commerce engines, etc. Hair service search server 108 can include manage a mobile-device application in both hair customer computing device(s) 102 and hair professional computing device(s) 104. The hair customer-side application can be used to implement geolocation-based hair-service search (e.g. key word searches, reverse-image searches, stylist searches, etc.). The hair professional-side application can be used to upload digital images of sample hair services performed by the respective hair professionals. The hair professional-side application can be used to provide additional information on a hair professional (e.g. location, marketing material, cost information, etc.). The hair professional-side application can be used for digital payments for hair services. Example hair-service search results and other hair-service search application interfaces are provided infra.

Hair service search server 108 can manage a chat-bot service. Chat-bot service can provide various interactive services via specified instant messaging platforms. The chat-bot can include a virtual assistant for a hair professional. Hair service search server 108 can utilize chatbots to interact with customers to, inter alia: answer basic questions about hair services; schedule hair services; implement electronic payments; etc.

Digital search engine can include one or more ranking and sorting functionalities. Digital search engine can rank hair-service query results. For example, given a query for a hair service and a collection of documents depicting digital images of hair services (and associated metadata such as, hair professional cost, location, etc.) that match the query, digital search engine can rank/sort the documents in D according to a set of specified criteria so that the best results appear early in the result list displayed to the user. Ranking can be reduced to the computation of numeric scores on query/document pairs; a baseline score function for this purpose is the cosine similarity between tf-idf vectors representing the query and the document in a vector space model, BM25 scores, or probabilities in a probabilistic IR model. Digital search engine can implement a sorting algorithm that puts hair service result elements of a list of results in a specified order based on relevancy to the hair customer's search input. Digital search engine can maintain an indexing system. The indexing system can include user uploaded tags, annotations, metadata, etc. associated with digital images to be searched.

Although not shown, hair product enterprises can access APIs provided by Hair service search server 108 via their own proprietary servers. Hair service search server 108 can enable hair product enterprises to upload digital advertisements and/or other digitized product information. These digital advertisements can then be rendered for display and served to both hair customer and/or hair professional webpage/mobile application interfaces. In additional to digital advertisements, hair product enterprises can also upload educational videos and the like. These can also be rendered for display and served to both hair customer and/or hair professional webpage/mobile application interfaces.

Per FIG. 1, hair service digital image store 110 can be used to store various digital files discussed herein. For example, hair service digital image store 110 can be used to stored digital images of hair styles and the like.

Figure 2:
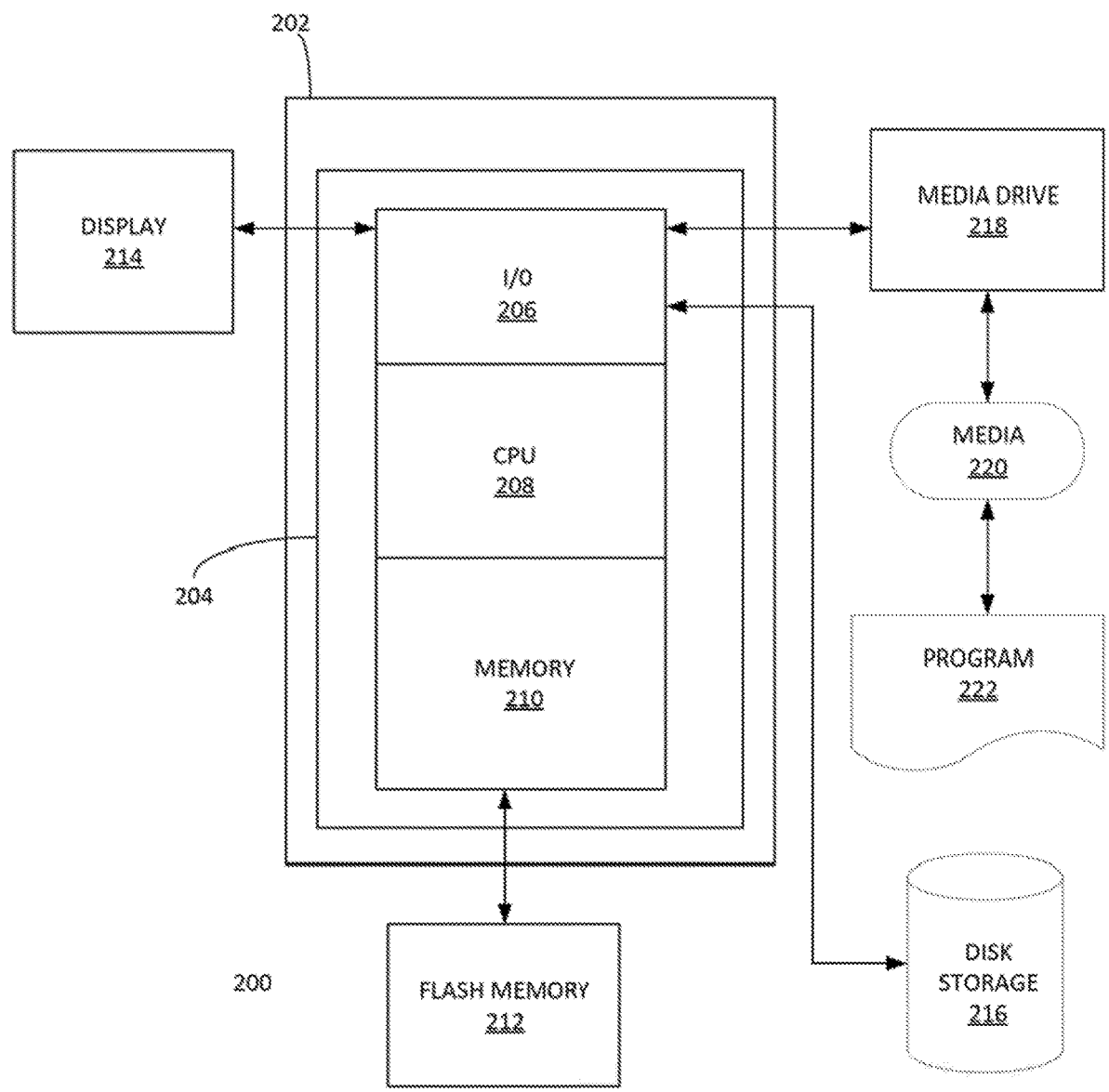
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
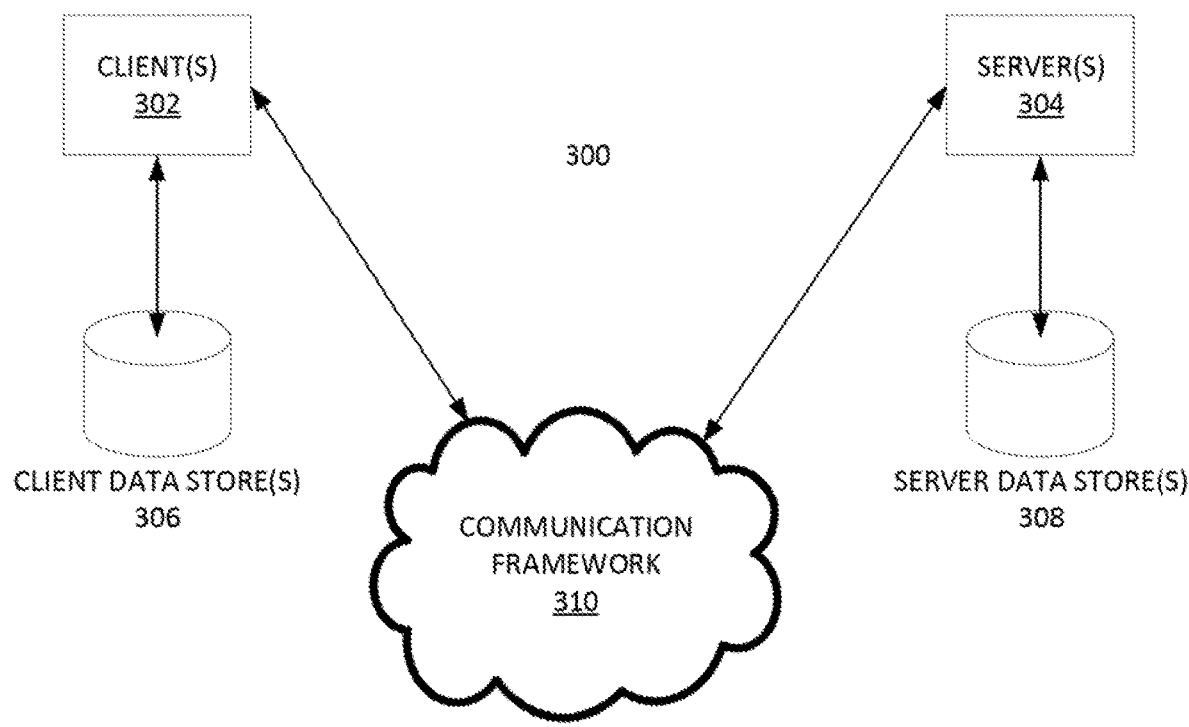
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Exemplary Methods

The following methods/processes can be implemented by systems 100-300.

Figure 4:
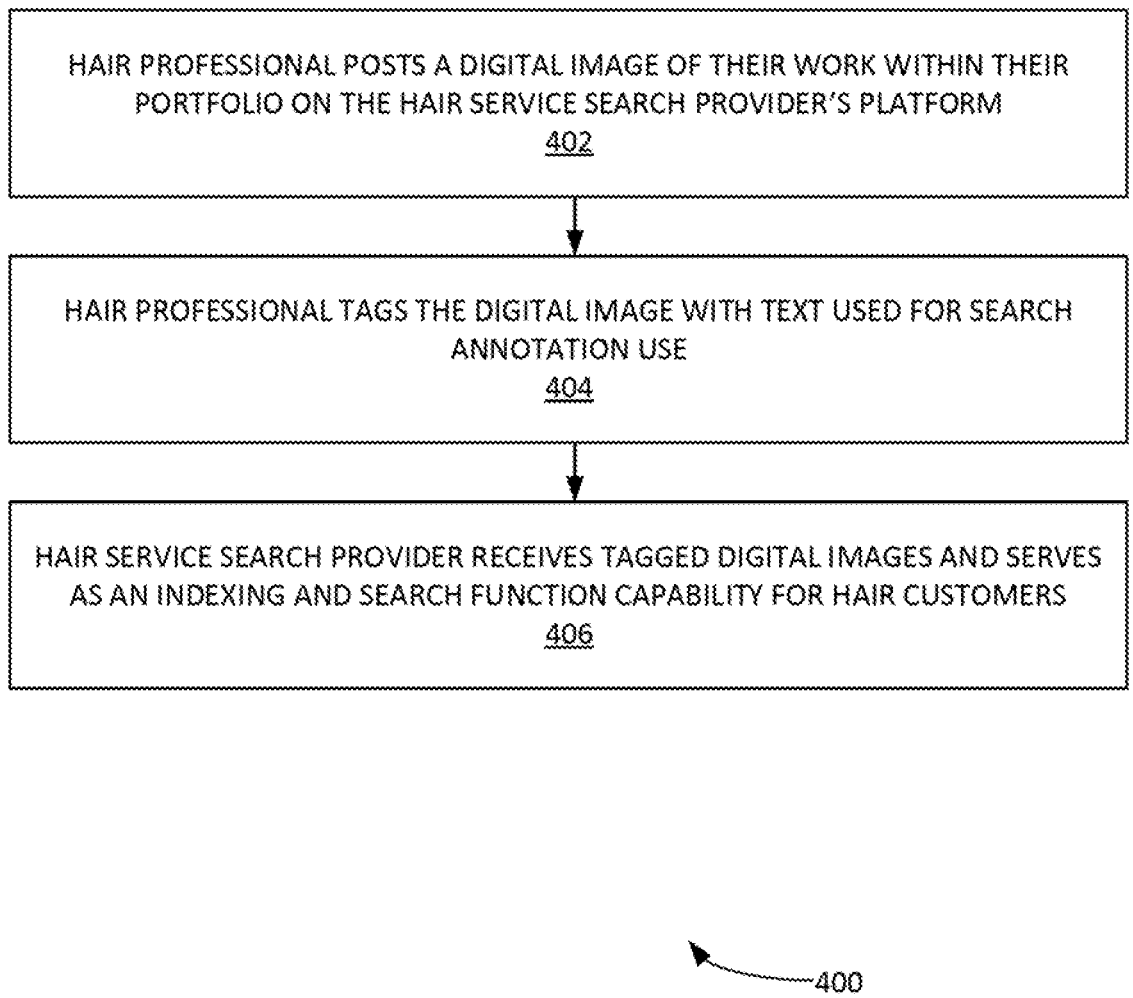
FIG. 4 illustrates an example process for enabling a hair professional to post a digital image of their work within their portfolio to a hair-service database that is searchable via mobile application and/or website, according to some embodiments.

FIG. 4 illustrates an example process 400 for enabling a hair professional to post a digital image of their work within their portfolio to a hair service database that is searchable via mobile application and/or website, according to some embodiments. In step 402, the hair professional posts a digital image(s) of their work within their portfolio on a hair service search provider. In step 404, the hair professional tags the digital image with text used for search annotation use. In step 406, the hair service search provider receives tagged digital images and serves for search and review by hair customers. In this way, process 400 can personalize the hair for hair customers and rank and return digital images hair types (e.g. hair style, thickness, color, demographic, length, etc.) that is related to the hair customer. For example, the search result can generate results that match to the user's hair based on specified hair parameters (e.g. only return similar hair texture, etc.).

Process 400 can use descriptions/input related to the user's hair type and style as part of the search. In one example, process 400 can present a questionnaire to the user via a mobile application to obtain terms and descriptions of the user, user's hair and the user's hair aspirations. In one example, process 400 can use image-processing algorithms, image-analysis algorithms and machine-vision algorithms to identify user hair attributes from an image of the user's hair. These user hair attributes can be used as a search engine input for process 400.

Figure 5:
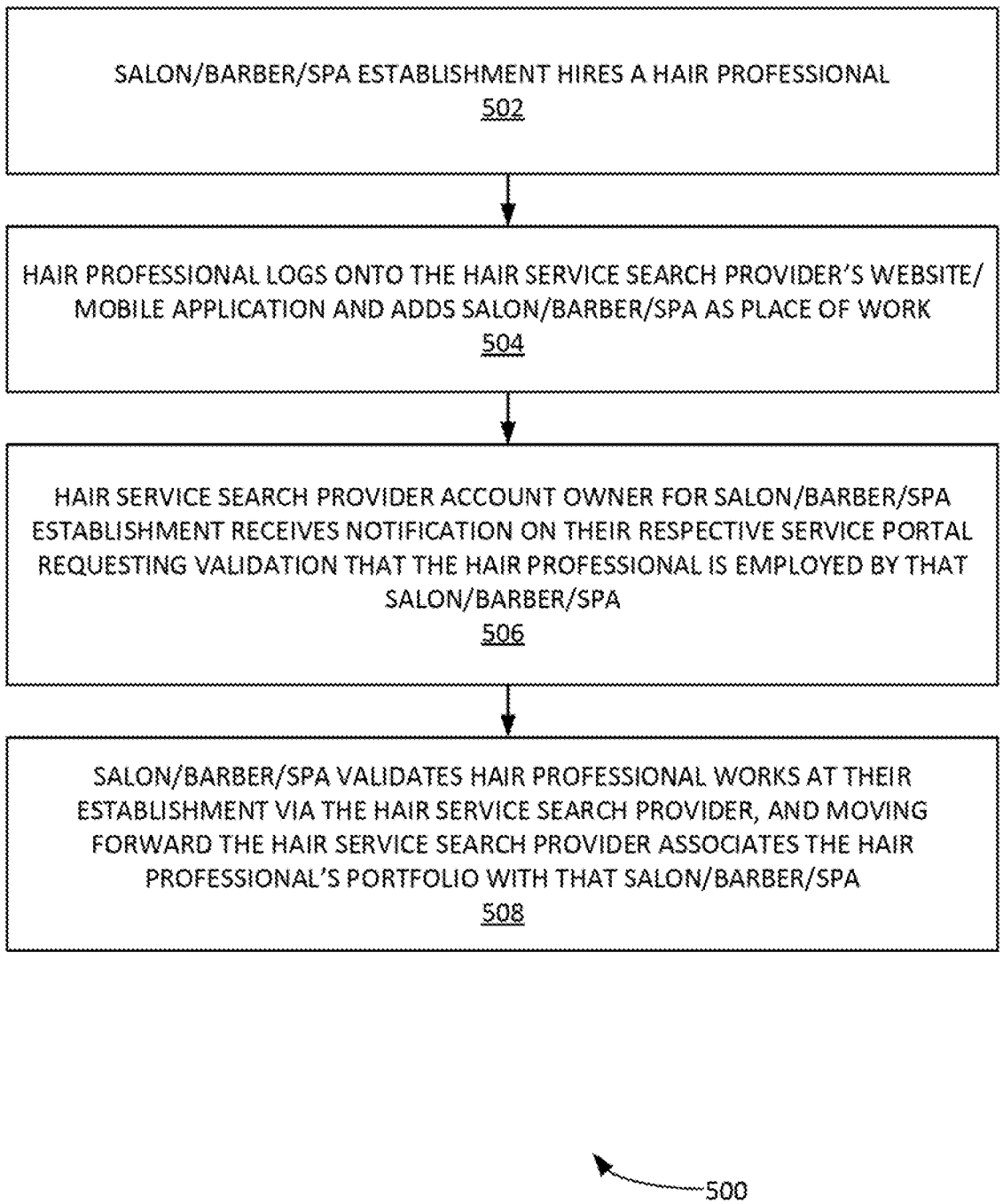
FIG. 5 illustrates an example process for validating a hair professional is employed at a specified salon/barber/spa in the hair service search provider's database, according to some embodiments.

FIG. 5 illustrates an example process 500 for verifying employment of a hair professional with a specified salon/barber/spa on the hair service search provider's platform, according to some embodiments. In step 502, a salon/barber/spa establishment hires a hair professional. In step 504, the hair professional logs onto the hair service search provider website/mobile application and adds salon/barber/spa as place of work. In step 506, hair service search provider account owner for salon/barber/spa establishment receives a notification on their respective service portal requesting validation that the hair professional is employed by that salon/barber/spa. In step 508, salon/barber/spa validates hair professional works at their establishment via the hair service search provider, and moving forward the hair service search provider associates the hair professional's portfolio with that salon/barber/spa.

Figure 6:
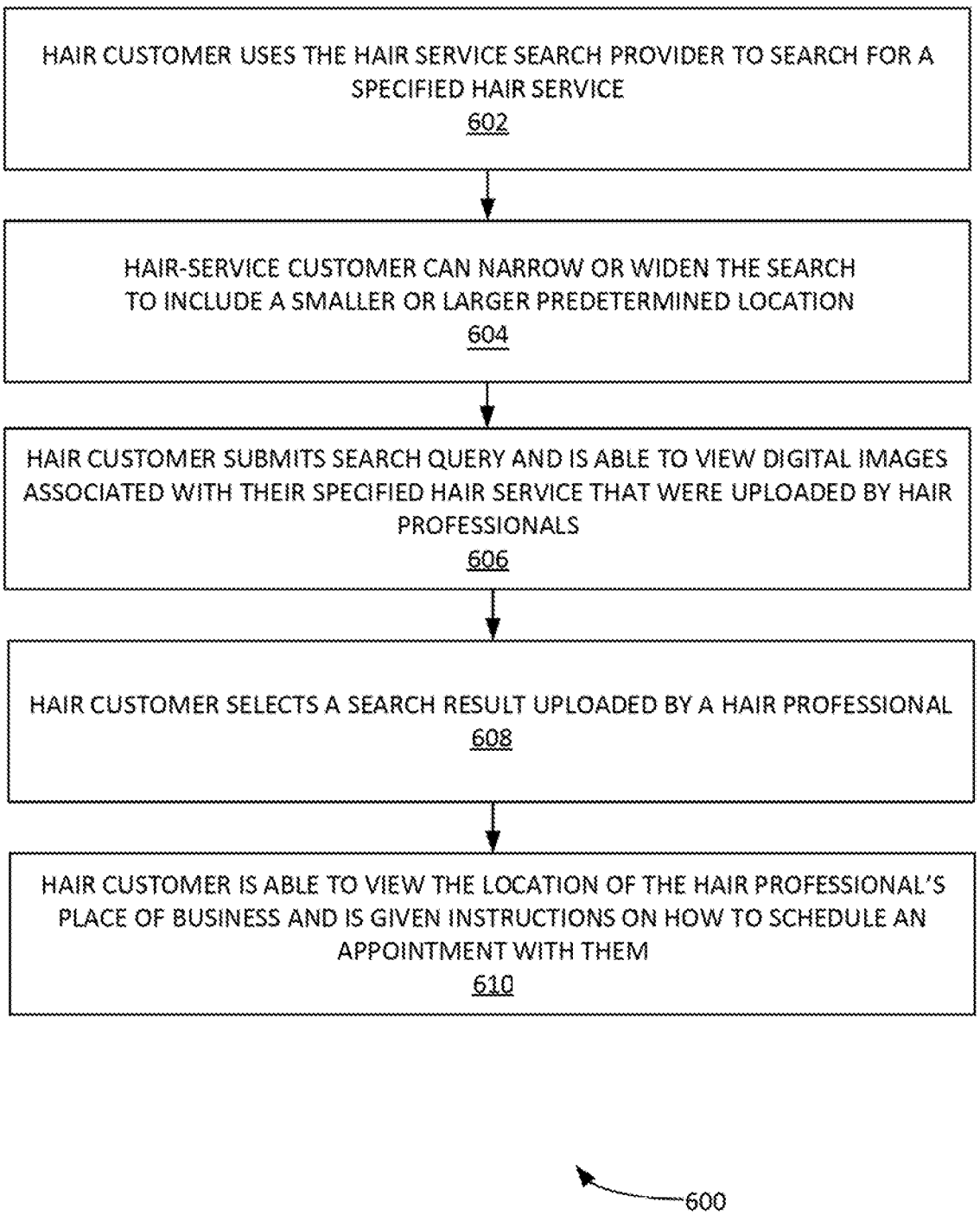
FIG. 6 illustrates a process for enabling a hair customer to utilize a hair-service search provider, according to some embodiments.

FIG. 6 illustrates a process 600 for enabling a hair customer to utilize a hairstyle search service, according to some embodiments. In step 602, a hair customer uses the hair service search provider to search for a specified haircut and/or hair color (e.g. using a hair service search provider's website/mobile application). The hair customer can search using predetermined words and/or digital images. The search input can be associated by the hair service search provider with one or more tags/annotations provided by hair professionals also using these inputs to tag their pictures (e.g. using an indexing system generated by a hair service search server).

In step 604, the hair customer can narrow or widen the search to include a smaller or larger predetermined location (e.g. via zip codes and miles away from a specified geolocation, etc.). In step 606, hair customer submits search query and is able to view digital images associated with their specified hair service that were uploaded by hair professionals. In step 608, the hair customer selects a search result uploaded by a hair professional. In step 610, hair customer is able to view where that hair professional works and is given instructions on how to schedule an appointment with them.

Figure 7:
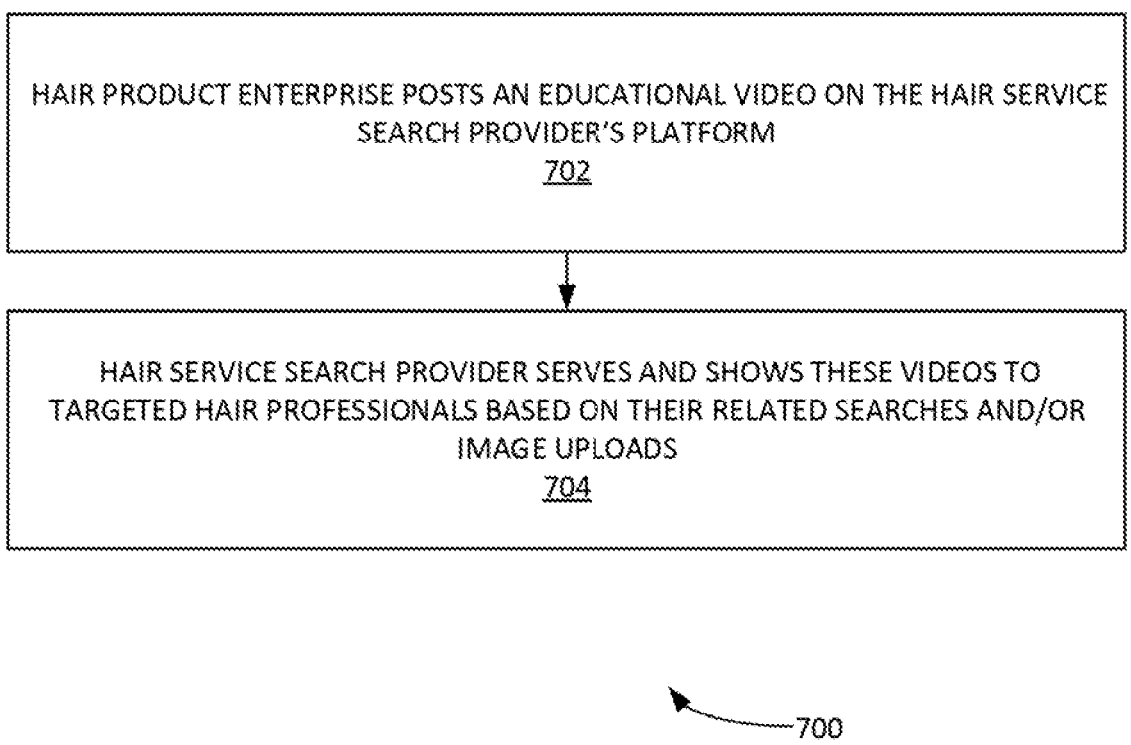
FIG. 7 illustrates an example process for providing an interactive interface for a hair product enterprise to access a hair-service search provider, according to some embodiments.

FIG. 7 illustrates an example process 700 for providing an interactive interface for a hair product enterprise to access a hair service search provider, according to some embodiments. In step 702, the hair product enterprise can post an educational video on the hair service search provider's platform. For example, the educational video can be how to use chemical coloring or styling products that require a hair license (cosmetology or barbering) to purchase and use with the intent of marketing/showing it to hair professionals.

In step 704, the hair service search provider can serve and show these videos to targeted hair professionals based on their related searches and/or image uploads.

Figure 8:
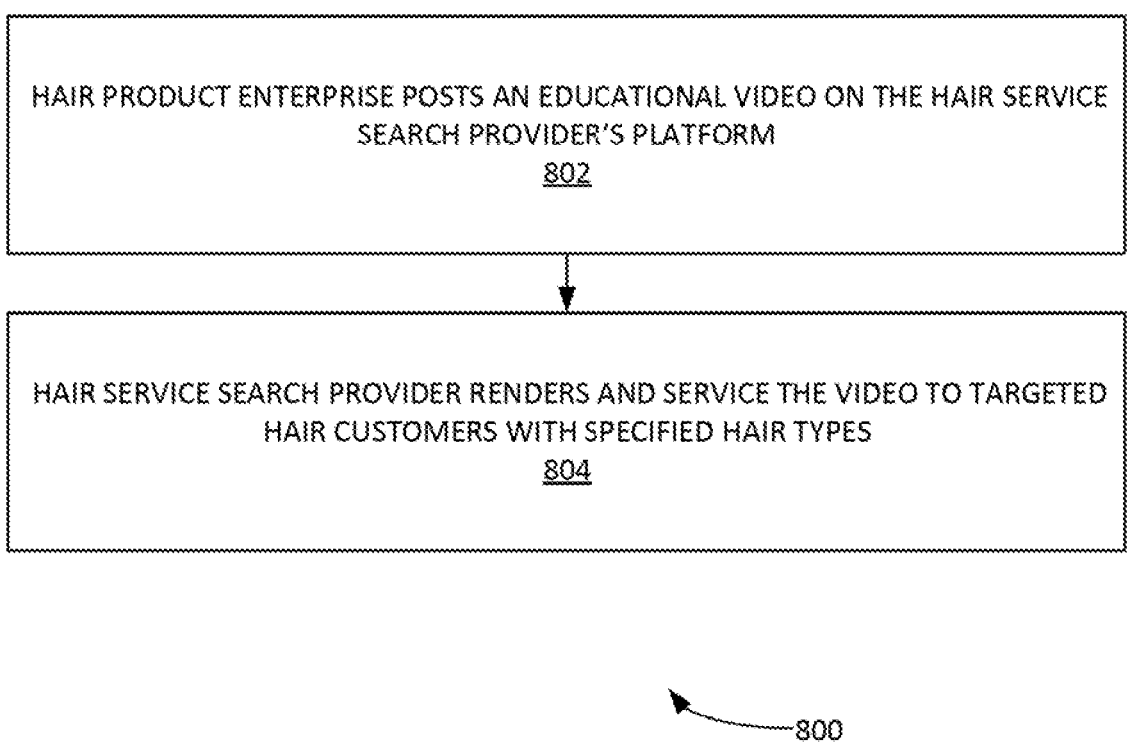
FIG. 8 illustrates another example process for providing an interactive interface for a hair product enterprise to access a hair-service search provider, according to some embodiments.

FIG. 8 illustrates another example process 800 for providing an interactive interface for a hair product enterprise to access a hair service search provider, according to some embodiments. In step 802, the hair product enterprise can post an educational video on the hair service search provider's platform. For example, the video can be related to leveraging various salon grade styling products that can be used by a hair customer outside of a professional salon/barber/spa business to maintain their hair style.

In step 804, the hair service search provider can render and service the video to targeted hair customers with specified hair types. The hair types can be identified by aggregating common search words and/or images used by each hair customer (e.g. from the hair service search provider's indexing system).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for implementing a hair-service based digital image search and ranking by a server, the method comprising:
  receiving a digitalized hair service portfolio from a hair professional application, wherein the hair service portfolio comprises hair professional contact information and a set of hair service digital images about one or more views of a set of hair professional customers;
  receiving, from the hair professional application, a set of tags for each hair service digital image of the set of hair service digital images, wherein each tag comprises a hair service descriptor of a hair service depicted in the hair service digital image;
  in response to receiving each hair service digital image and associated tags from the hair professional application, applying annotations to the hair service digital image by:
    extracting feature vectors from each hair service digital image;
    learning correlations between the extracted feature vectors and training annotations using a relevance model based on a translation of textual vocabularies to visual vocabularies;
    determining one or more annotations from the training annotations based on the learned correlations; and
    applying the one or more determined annotations to each hair service digital image of the set of hair service digital images;
  storing the digitalized hair service portfolio, the set of hair service digital images, the set of tags, the one or more determined annotations, and the hair professional contact information in a digitalized hair service portfolio database;
  receiving the search from a customer application associated with a user, Wherein the search comprises a hair service search image;
  parsing the hair service search image to identify hair service attributes in the hair service search image by utilizing a content-based image retrieval (CBIR) system;
  searching the annotations and the tags associated with the stored set of hair service images that match the identified attributes of the received hair service search image to generate a search result of hair service digital images;
  determining a cosine similarity between vectors representing the received hair service search image and the feature vectors of the set of hair service images in the search result;
  obtaining a matching hair service digital image by, ranking the search result based on the cosine similarity and modifying the search result via markup code of a web page or the customer application based on the ranking; and
  transmitting the matching hair service digital image and the hair professional contact information to the customer application associated with the user for display on the web page or a mobile application interface of the customer application.

2. The computerized method of claim 1, wherein the search comprises a text search.

3. The computerized method of claim 2 further comprising:
  updating the text search to include a hair service tag and a hair service color tag.

4. The computerized method of claim 1, wherein the hair service descriptor comprises a hair service type, a hair coloring type, or a model descriptor type.

5. The computerized method of claim 1, wherein the hair professional contact information comprises a location of the hair professional.

6. The computerized method of claim 1, wherein the matching hair service digital image is determined based on a combination of a match between the stored set of hair service images and the received hair service search image, and a match between a location of the hair professional with respect to a user location.

7. The computerized method of claim 1, wherein the hair service attributes comprise one or more of a hair service color, a hair thickness, a hair service demographic, and a hair service length in the hair service search image.

8. The computerized method of claim 7, further comprising tagging the hair service search image with a hair service tag, a hair service color tag, a hair service thickness tag, a hair service demographic tag, and a hair service length tag, wherein searching the annotations is based on tags of the received hair service search image.

9. The computerized method of claim 1, wherein the model is a vector space model or a probabilistic information retrieval model.

10. The computerized method of claim 1, wherein the customer application is a mobile application, wherein the method further comprises:
  implementing a geolocation-based hair service search using the customer application.

11. A computer system for implementing a hair-service based digital image search and ranking by a server comprising:
  a processor;
  a memory containing instructions when executed on the processor, cause the processor to perform operations that:
    receive a digitalized hair service portfolio from a hair professional application, wherein the hair service portfolio comprises hair professional contact information and a set of hair service digital images about one or more views of a set of hair professional customers;
    receive, from the hair professional application, a set of tags for each hair service digital image of the set of hair service digital images, wherein each tag comprises a hair service descriptor of a hair service depicted in the hair service digital image;
    in response to receiving each hair service digital image and associated tags from the hair professional application, apply annotations to the hair service digital image by:
      extracting feature vectors from each hair service digital image:
      learning correlations between the extracted feature vectors and training annotations using a relevance model based on a translation of textual vocabularies to visual vocabularies;

determining one or more annotations from the training annotations based on the learned correlations; and applying the one or more determined annotations to each hair service digital image of the set of hair service digital images;

store the digitalized hair service portfolio, the set of hair service digital images, the set of tags, the one or more determined annotations, and the hair professional contact information in a digitalized hair service portfolio database;

receive the search from a customer application associated with a user, wherein the search comprises a hair service search image;

parse the hair service search image to identify hair service attributes in the hair service search image by utilizing a content-based image retrieval ((MIR) system;

search the annotations and the tags associated with the stored set of hair service images that match the identified attributes of the received hair service search image to generate a search result of hair service digital images;

determine a cosine similarity between vectors representing the received hair service search image and the feature vectors of the set of hair service images in the search result;

obtain a matching hair-style digital image by ranking the search result based on the cosine similarity and modify the search result via markup code of a web page or the customer application based on the ranking; and transmit the matching hair service digital image and the hair professional contact information to the customer application associated with the user for display on the web page or a mobile application interface of the customer application.

12. The computerized system of claim 11, wherein the search comprises a text search.

13. The computerized system of claim 12, wherein the memory containing instructions when executed on the processor, further cause the processor to perform an operation that updates the text search to include a hair service tag and a hair service color tag.

14. The computerized system of claim 11, wherein the hair service descriptor comprises a hair service type, a hair coloring type, or a model descriptor type.

15. The computerized system of claim 11, wherein the hair professional contact information comprises a location of the hair professional, and wherein the matching hair service digital image is determined based on a combination of a match between the stored set of hair service images and the received hair service search image, and a match between a location of the hair professional with respect to a user location.

16. The computerized system of claim 11, wherein the search from the user further comprises a description of the user's hair type.

17. The computerized system of claim 16, wherein the user's hair type is obtained via a questionnaire that identifies various user hair variables, and wherein a user hair variable comprises a hair straightness value, a hair curly value, a user demographic grouping, a user age, a hair thickness value, or a hair length value.

18. The computerized system of claim 16, wherein the search comprises a user's digital image that comprises one or more digital images of the user's hair, and wherein the user's digital image is parsed into a set of user hair variables.

19. The computerized system of claim 11, wherein the model is a vector space model or a probabilistic information retrieval model.

20. The computerized system of claim 11, wherein the customer application is a mobile application, wherein the memory containing instructions when executed on the processor, further cause the processor to perform a geolocation-based hair service search using the customer application.

* * * * *